Jan. 4, 1949.  J. M. ROBERTSON  2,458,202
APPARATUS FOR FORMING COMPOSITE BEARINGS
Filed June 16, 1944
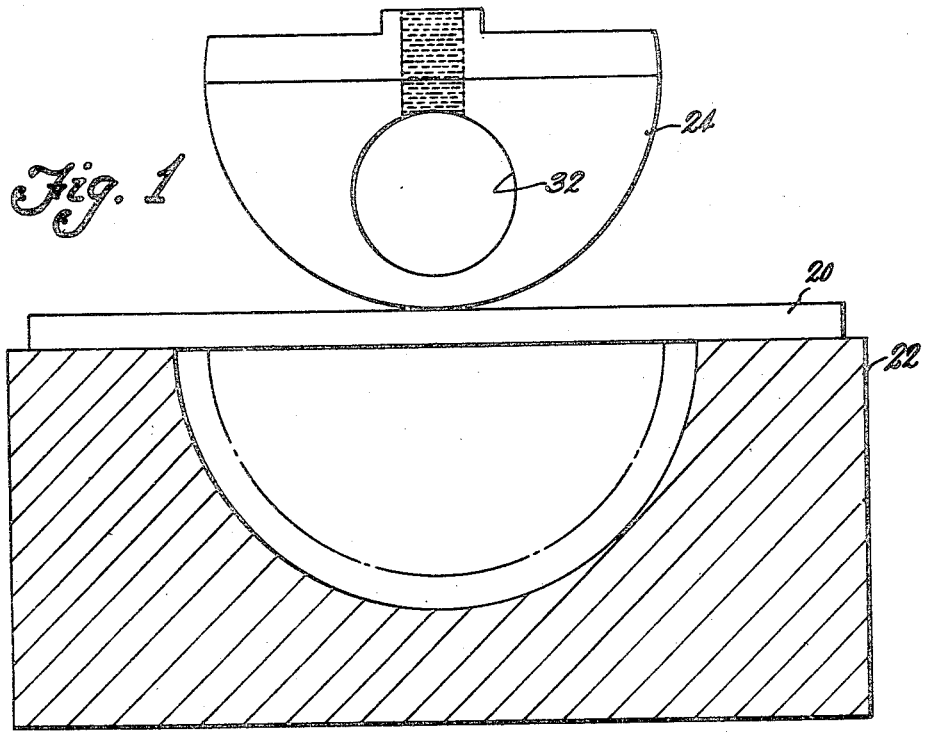
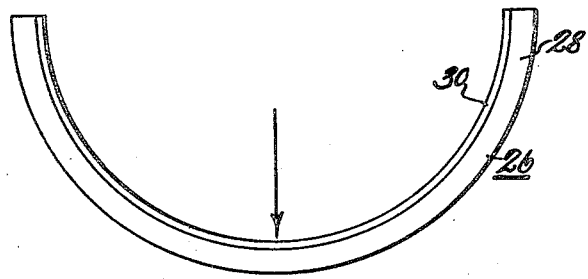
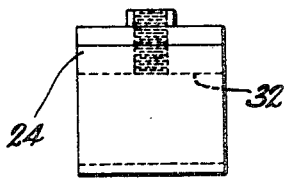
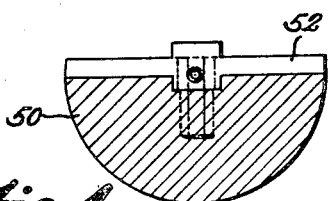
INVENTOR
John M. Robertson
BY
his ATTORNEYS Patented Jan. 4, 1949

2,458,202

UNITED STATES PATENT OFFICE 2,458,202

APPARATUS FOR FORMING COMPOSITE BEARINGS

John M. Robertson, Dayton, Ohio, assignor to General Motors Corporation, Detroit, Mich., a corporation of Delaware Application June 16, 1944, Serial No. 540,559

1 Claim. (Cl. 153—48)

This invention relates to an apparatus for forming bearings and is particularly concerned with an apparatus for evenly distributing the compression load used in forming bearings into semi-circular form.

An object of the invention is to provide an apparatus for forming bearings such as semi-circular bearings wherein an even distribution of load is effected on the bearing during the forming operation.

In carrying out this object it is a further object of the invention to provide a punch for use in the forming of a bearing which has a degree of resiliency, or compressibility, at the central portion thereof whereby the load is distributed evenly over the surface of the bearing.

Another object of the invention is to provide an apparatus which prevents flattening or deformation of the bearing at the exact center thereof thereby providing a uniform thickness bearing.

A still further object of the invention is to provide an apparatus for forming bearings which are made of ductile material or which include a layer of ductile material thereon that is easily compressible and deformable whereby the ductile material is compressed uniformly and does not include non-uniform cross sections after the forming operation.

In carrying out the above objects, it is a still further object of the invention to provide a punch for use in circle forming bearings which has an aperture therethrough on the center line thereof so that the central portion of the punch has a degree of compressibility or resiliency whereby the load is distributed and is not concentrated at the center of the bearing.

Still another object of the invention is to provide a punch made of a resilient material, for example, fabric reinforced phenolformaldehyde resin, vulcanized fiber material or the like, wherein the punch, during use, has some "give" or compressibility at the central portion thereof whereby the load is distributed uniformly over the bearing.

Another object of the invention is to provide an apparatus for forming bearings in a semi-circular shape wherein the completed bearings are of a uniform cross section throughout even though such bearings include a radially compressible portion such as, a babbitt bearing layer or a porous metal layer thereon.

Further objects and advantages of the present invention will be apparent from the following description, reference being had to the accompanying drawings wherein preferred embodiments of the present invention are clearly shown.

In the drawings:

Fig. 1 is a view partly in section of one embodiment of a die and punch used for forming semi-circular bearings.

Fig. 2 is a side view of the punch shown in Fig. 1.

Fig. 3 is a side view of a typical bearing which may be formed in the apparatus and by the method disclosed wherein a bearing layer is supported by stronger metal backing material and Fig. 4 is a view of a modified punch construction utilizing a non-metallic punch surface.

In the circle forming of bearings, that is in the shaping of flat bearing stock into semi-circular form, much difficulty has been experienced in the use of composite material wherein a layer of soft bearing metal is carried by a steel supporting member. This difficulty revolves around the fact that in the circle forming of such material, excessive loads are impressed at the exact center of the bearing which tend to flatten the more ductile bearing layer of the composite bearing material. Composite bearing material may include steel, having a babbitt layer thereon, steel having a porous metal matrix layer thereon which, in itself, may or may not be impregnated with babbitt or some other soft bearing metal. Similar difficulties are also experienced when forming any ductile metal such as soft copper or bronze or babbitt per se. In other words, the difficulty apparent at the center of the bearing during formation thereof, is apparent in any bearing which has at least a portion thereof formed from a ductile material which is deformable at the loads used to form the bearing.

In the operation of formation, a bearing blank 20, in the flat condition, is placed over a die 22 and then the punch 24 descends upon the blank 20 forming it into a V shape whereupon it bottoms in the die 22 after which the punch 24 further operates on the blank 20 until the blank 20 coincides substantially to the contour of the die to form a bearing 26 including a steel backing 28 and a bearing layer 30. Obviously, in this operation if the bearing is relatively thick and requires any substantial load application, the major portion of this load is applied at the exact center of the bearing, noted by the arrow in Fig. 3, which, tends to thin out or flatten the center of the bearing. If lower pressures are utilized there appears on either side of the center of the bearing a hollow portion wherein the bearing layer does not exactly coincide to the contour of the punch due to the fact that the original shape of the bearing blank upon the initial phase of formation is that of a V. In the past, in order to eliminate these hollows, high pressure loading was used which compressed the central portion of the bearing while simultaneously eliminating the hollows. Obviously, this expedient for correcting one difficulty, presented another difficulty which was equally as undesirable.

In order to provide circular bearings without thinning out the central portion, thereof, or causing hollows to be formed, I propose to provide a punch 24 having a certain degree of resiliency or compressibility therein particularly at the central portion thereof. In order to accomplish this I have found that if a steel punch is used, a hole 32 may be drilled axially therethrough on the center line so as to leave a relatively thin section of metal between the punch surface and the hole. This hole 32 permits slight deflection of the center of the punch which eliminates the thinning out of the metal at the center of the bearing during the punching operation by distributing the load so that the hollows heretofore apparent are eliminated. I have found that with a punch having a diameter of 3.5 inches for example that a 1.25 inch hole offset ⅞ of an inch from the center of the punch provides sufficient resiliency to permit proper formation of a bearing 26. In this connection, the wall between the hole and the punch surface at the center of the punch is about to ½ inch. The exact size of the hole through the punch to provide sufficient resiliency, must be determined by trial since it is obvious that the size of the hole will vary in accordance with the load impressed. In the case of the particular punch noted, bearings having a steel wall thickness of from .108 inch to .130 inch were formed. In the manufacture of the punch, the formed punch was carburized after which the hole was bored and the surface of the punch ground. The finished machined punch was then hardened and drawn.

Another embodiment of the invention is shown in Fig. 4 where instead of a steel punch 24 the punch surface 50 consists of a non-metallic material, for example, "Spauldite" which is laminated fabric bound together with phenol formaldehyde resin or Spaulding vulcanized fiber may be used, etc. In these instances, the punch 50 was formed from the non-metallic material and then was suitably attached to a steel backing member 52 which was attached to the press. The action of the punch in this instance is identical to the action of the punch shown in Fig. 1. The non-metallic material is resilient to a degree and a distribution of the load is accomplished over the entire surface of the bearing thereby eliminating any thinning out of the bearing layer or hollows therein. Over 15 thousand pieces were run on one punch of this character without any appreciable wear of the punch and it is believed that additional thousands of pieces could have been run prior to any replacement. Obviously, there are other modifications of design such as a steel punch having a reinforced resin surface thereon of sufficient thickness to provide the desired resiliency or in the case of the steel punch more than one hole could be utilized or rubber punches of high durometer reading or other types of plastic punches, etc. All of these modifications come within the scope of my invention which broadly contemplates resiliency in the punch at the center thereof regardless of how such resiliency is obtained and the embodiments shown herein are merely two of the more facile instrumentalities embodying the invention.

The foregoing disclosure is directed to a method and apparatus for circle forming strip stock for bearing purposes. In many instances, finishing operations are required on the circle formed bearing to bring the bearing within precision limits, such as, grinding of the back, machining the bearing layer, or swaging the bearing at the ends thereof. All of these expedients or other desired finishing operations may or may not be necessary depending upon the accuracy desired.

While the embodiments of the present invention as herein disclosed, constitute preferred forms, it is to be understood that other forms might be adopted, all coming within the scope of the claim which follows.

What is claimed is as follows:

Apparatus for circle forming strip stock comprising in combination; a die member having a semi-cylindrical cavity therein, a punch of a shape complementary to said cavity but of less diameter whereby clearance is obtained between the punch and the die substantially equal to the thickness of the strip to be circle formed, said punch being formed from a single piece of steel and having a continuous working face and including a lateral aperture drilled therethrough and having the axis thereof in exact parallelism to the surface of the punch whereby a relatively thin portion of metal extends between the aperture and the surface of the punch which portion is compressible upon pressure applied thereto.

JOHN M. ROBERTSON.

REFERENCES CITED

The following references are of record in the file of this patent:

UNITED STATES PATENTS

| Number | Name | Date |
|---|---|---|
| 1,259,573 | Williams | Mar. 19, 1918 |
| 1,268,360 | Kimbell | June 4, 1918 |
| 1,744,030 | Chadwick | Jan. 21, 1930 |
| 2,031,982 | Salzman | Feb. 25, 1936 |
| 2,122,142 | Huck | June 28, 1938 |

FOREIGN PATENTS

| Number | Country | Date |
|---|---|---|
| 554,100 | Great Britain | June 21, 1943 |